United States Patent Office 3,100,797
Patented Aug. 13, 1963

3,100,797
PRODUCTION AND CRYSTALLIZATION OF 3,5-DINITRO-o-TOLUIC ACID FROM NITRIC AND SULFURIC ACID
Guy Hendrickson Harris, Concord, and Bryant Charles Fischback, Walnut Creek, Calif., assignors to The Dow Chemical Company, Midland, Mich., a corporation of Delaware
No Drawing. Filed Jan. 23, 1958, Ser. No. 710,614
6 Claims. (Cl. 260—515)

This invention relates to processes for the nitration of o-toluic acid to form 3,5-dinitro-o-toluic acid.

Conventional processes for making 3,5-dinitro-o-toluic acid require the use of purified o-toluic acid and, even so, frequently require recrystallization of the product to produce a high grade product. Also, they require the use of fuming sulfuric or nitric acid, or both.

An object of this invention is to provide economical processes for making high grade 3,5-dinitro-o-toluic acid from crude o-toluic acid without necessity for using fuming acids or for recrystallizing the product. Other objects will appear hereinafter.

According to the invention, o-toluic acid is reacted with nitric acid in the presence of sulfuric acid, preferably, in an inert chlorinated aliphatic hydrocarbon solvent, at a temperature of about 25 to 110° C. The reaction is fairly rapid and a large part of the product usually crystallizes during the reaction period. The remainder crystallizes when the temperature is adjusted to 0 to 30° C. and is separated by filtration, decantation, or other mechanical means. The concentration of sulfuric and nitric acids used may be varied within wide limits so long as the mixture of the two does not contain more than about 15 percent of water. At least 2, and preferably 2.2 to 2.5 moles of nitric acid and at least about 10 moles and preferably about 15 to 25 moles of sulfuric acid per mole of o-toluic acid should be used. Since sulfuric acid is used in greater amount than is nitric acid, it may be seen that the use of highly concentrated sulfuric acid, such as 100 percent acid or even oleum, permits the use of correspondingly more dilute nitric acid without the water content of the combined acids exceeding the limit of 15 percent. As a matter of economy, however, we generally prefer to use ordinary 96 percent sulfuric acid and 70–90 percent nitric acid.

A major advantage of the process of the invention is that a crude grade of o-toluic acid may be used and yet produce highly pure 3,5-dinitro-o-toluic acid. Thus, the o-toluic acid obtained by the catalytic air oxidation of o-xylene, which normally contains 10 to 20 percent of impurities such as isomeric m- and p-toluic acids, phthalic acid, phthalide, and tolualdehyde, is quite suitable without preliminary purification, since the bulk of such impurities and their nitration products remains in the mother liquor after separation of the crystalline 3,5-dinitro-o-toluic acid in the final step of our process. If desired, these impurities may be recovered from the mother liquor by any suitable means, such as by precipitating them by diluting the mother liquor with water and then separating the organic phase from the aqueous phase.

The solvent used in the process of the invention should have four special properties:

(1) It should be inert in the reaction mixture;
(2) It should be an effective solvent for o-toluic acid, at least at reaction temperature;
(3) It should be a relatively poor solvent for 3,5-dinitro-o-toluic acid, at least at 0–30° C.; and
(4) It should be sufficiently volatile to be readily recoverable from the mother liquors from which the desired product has been removed.

While doubtless there are other suitable solvents which meet the above requirements, the chlorinated lower aliphatic hydrocarbons comprise the preferred class. By "lower aliphatic," as used herein, we mean those containing 1 to 4 carbon atoms. Suitable solvents include methylene chloride, chloroform, carbon tetrachloride, ethylene chloride, trichloroethylene, perchloroethylene, the propylene and butylenes chlorides, methylchloroform, 1,2,3-trichloropropane and the like.

A particularly preferred class of solvents consists of those having a normal boiling point such that the process can be operated at atmospheric pressure and under reflux of the solvent. Such solvents should preferably have boiling points in the range of about 25 to 100° C. Other solvents having lower boiling points, such as methyl or ethyl chloride, may be used, provided the reaction is conducted in a closed system and under sufficient pressure to keep most of the solvent in the liquid state. Likewise, higher-boiling solvents may be used under either atmospheric pressure or, if reflux is desired, under suitably reduced pressure.

The time required for the nitration reaction depends largely on the concentration of the sulfuric and nitric acids used and the temperature at which the reaction takes place. It is ordinarily a rather rapid reaction, and may be nearly complete as soon as the reactants have been thoroughly mixed. Longer reaction time, up to 24 hours or more, apparently is not harmful and may sometimes increase the yield when low reaction temperatures and relatively weak reactant acids are used.

The practice of the invention is illustrated by the following examples.

Example 1

Crude o-toluic acid (25.6 g.) containing about 5 percent of m-toluic acid and other impurities was dissolved in 115 cc. of methylene chloride and the resulting solution was slowly stirred into a mixture of 26 cc. (3 equivalents) of 90 percent nitric acid and 205 cc. of 96 percent sulfuric acid, the temperature being maintained at 75° C. with continuous removal, by distillation, of the solvent. After all the reactants had been mixed the mixture was stirred for 15 minutes, during which time the temperature was allowed to drop to 60° and crystallization began. The temperature was then lowered to 25° and the crystalline product separated by filtration. After being washed with ice water and dried at room temperature the yield was 37.1 grams (87.2 percent of theory) of high grade 3,5-dinitro-o-toluic acid having a melting point of 204–7° C. (uncorr.).

Example 2 o-Toluic acid (34.0 grams, containing approximately 5 percent m-toluic acid and 11 percent neutral fraction, mostly phthalide) was dissolved in 204 cc. of 96 percent sulfuric acid at 21° C. Ninety percent nitric acid (24 cc.; 2 equivalents) was added in two equal portions. The first addition caused the temperature of the reaction mixture to reach 78°. After cooling to 45° by external means, the second portion of nitric acid was added and the temperature rose to 79°. The product was cooled to 25° after 25 minutes. The almost white crystalline product was separated from the dark red-brown sulfuric acid solution by filtration, washed well with cold water, and subsequently air dried. Yield: 38.8 grams (82.3 percent yield based on 84 percent pure o-toluic acid). The product thusly obtained melted at 203–5° C. (uncorr.).

Example 3

In a manner similar to that used in Example 2, o-toluic acid (288 grams containing approximately 5 percent m-toluic acid) was dissolved in 1715 cc. of 96 percent sulfuric acid. Seventy percent nitric acid (296 cc., 2.2 equivalents) was added in the following manner: 100 cc. added raised the temperature to 75° C. After cooling to 51° another 50 cc. was added and the temperature rose to 68° C. Some solid began to precipitate out. The mixture was cooled to 44° and the remaining 146 cc. was added. The temperature rose to 84°. The mixture was cooled to 25° and filtered. The precipitate was washed well with water and was subsequently air dried. Yield: 419.0 grams which represents 92.4 percent yield. The product melted at 206–7° C. (uncorr.).

*Example 4*

A continuous operation was carried out as follows: o-toluic acid (12.10 pounds, containing approximately 5 percent m-toluic acid and 6 percent neutral impurities) dissolved in approximately 20 liters of methylene chloride was added to a 50 liter reactor to which a mixture of 48.8 liters of 96 percent sulfuric acid and 10.18 liters of 90 percent nitric acid was added simultaneously. The addition was carried out at about 75° C. and took a total of 7 hours during which time the solvent distilled from the system. Some of the resulting product was continuously removed from the reaction zone. After the addition was complete, the mixture was allowed to cool to 25° and the precipitate was filtered out, washed well with cold water and air dried. Yield was 16.10 pounds which represents 90 percent yield. The product melted at 203–5° C. (uncorr.).

*Example 5*

In a manner similar to Example 1, o-toluic acid (60.0 grams, containing approximately 9 percent m-toluic acid, 2 percent p-toluic acid and 8 percent neutral fraction) was dissolved in 250 cc. of methylene chloride. This solution was added with agitation to a mixture of 420 cc. of 96 percent sulfuric acid and 62 cc. (3 equivalents) of nitric acid at 75° C. The methylene chloride was continually boiled out of the system. Crystallization took place after the addition was complete, the mixture was held with stirring at 75° for 15 minutes. The mixture was then cooled to 10° by an external ice bath. The precipitate was filtered off, washer well with ice water and dried at 100° for 4 hours. Yield was 74.4 grams (92.0 percent). The product thus obtained melted at 204–7° C. (uncorr.).

*Example 6*

In a run patterned after Example 5, the same crude o-toluic acid in the same amount was treated with exactly the same length of time, operating temperatures, etc. In this case, after being cooled to 10° C., the product was poured on 2 liters of ice and water. The precipitate was filtered, washed well with ice water, and dried at 100° for 4 hours. Yield was 83.4 grams (103 percent). The product melted at 188–203° C. (uncorr.). The high yield and low melting point indicated a much more impure product than that obtained by filtration as per Example 5.

Because of the speed of the reaction and the simplicity of the process steps, it has been found that the process is especially suited for continuous operation. Thus, the o-toluic acid may be dissolved in an inert solvent or suspended in the sulfuric acid and continuously fed into a reactor into which is simultaneously fed the nitrating acid. The reaction mixture is continuously withdrawn, cooled and the crystalline product separated. The mother liquor may be recycled to the reactor and reused until contamination becomes excessive. Low grade product made by use of highly contaminated nitrating acid may be purified by recycling it to a nitration step in which fresh nitrating acid is used.

The nitration step of our process has been found to proceed satisfactorily at temperatures in the range of about 25–110° C. Below 25° the reaction is slow and nitration may be incomplete while above about 110° there may be undesirable oxidation with resultant low yields and purity of the desired product.

The process of the invention is also applicable to other ortho-alkyl benzoic acids such as o-ethylbenzoic acid, 2,4-dimethylbenzoic acid, 2-ethyl-4-methylbenzoic acid, and the like, whereby the corresponding nitro-o-alkyl-benzoic acids are obtainable.

We claim:

1. The process for producing 3,5-dinitro-o-toluic acid consisting essentially of reacting by contacting o-toluic acid with a mixture of about 2 to 2.5 moles of nitric acid and about 10 to 25 moles of sulfuric acid per mole of o-toluic acid at a temperature of about 25 to 110° C., said nitric and sulfuric acids being of such concentrations that the mixture thereof contains not more than about 15% by weight of water, until substantial reaction has occurred, adjusting the temperature of the reaction mixture to about 0 to 30° C. and separating from the mixture the thus formed crystals of 3,5-dinitro-o-toluic acid.

2. The process defined in claim 1 wherein after separation of the crystals of 3,5-dinitro-o-toluic acid the mother liquor from which the crystals were separated is recycled to the process.

3. The process defined in claim 1 wherein the o-toluic acid is made by the catalytic air oxidation of o-xylene and contains about 5 to 20% by weight of cogeneric impurities.

4. The process defined in claim 1 wherein the toluic acid is dissolved in an inert chlorinated lower aliphatic hydrocarbon solvent and the resulting solution is added to the mixture of sulfuric and nitric acids.

5. The process defined in claim 4 wherein the solvent is methylene chloride.

6. The process for making 3,5-dinitro-o-toluic acid consisting essentially of dissolving o-toluic acid in methylene chloride, said o-toluic acid having been made by the catalytic air oxidation of o-xylene and containing about 5 to 20% by weight of cogeneric impurities; adding the resulting solution to a mixture of about 2 to 2.5 molar equivalents of nitric acid and about 10 to 25 molar equivalents of sulfuric acid, said equivalents being based on the amount of o-toluic acid used, said nitric and sulfuric acids being of such concentrations that the mixture thereof contains not more than about 15% by weight of water, the temperature of said mixture of acids being maintained at about 25–110° C. during the addition and for a time thereafter sufficient for substantial nitration of the o-toluic acid and for the evaporation of substantially all of the methylene chloride from the reaction mixture, adjusting the temperature of the reaction mixture to about 0–30° C. separating the thus formed crystals of 3,5-dinitro-o-toluic acid from the liquid phase of the reaction mixture and recycling at least a portion of the said liquid phase to the process as a part of the required mixture of nitric and sulfuric acids.

References Cited in the file of this patent

UNITED STATES PATENTS 2,435,314    Kokatnur            Feb. 3, 1948
2,826,611    Fischback et al.      Mar. 11, 1958

OTHER REFERENCES

The Merck Index, 6 ed., p. 677 (1952).
Sah et al.: Chem. Absts., vol. 31, col. 3823 (1937).
Candea et al.: Chem. Absts., vol. 33, col. 1294 (1939).
Wagner et al.: Synthetic Organic Chemistry, pages 746–748 (1953).
Degering: An Outline of Organic Nitrogen Compounds, pages 117–118 (1945). (Copies in Library.)